Oct. 28, 1969 C. C. HEPKER 3,475,656

RADIO CHASSIS ASSEMBLY

Filed July 15, 1966

INVENTOR.
CASSWELL C. HEPKER

BY [signature]
ATTORNEY

United States Patent Office 3,475,656

Patented Oct. 28, 1969

3,475,656

RADIO CHASSIS ASSEMBLY

Casswell C. Hepker, Cedar Rapids, Iowa, assignor to Collins Radio Company, Cedar Rapids, Iowa, a corporation of Iowa Filed July 15, 1966, Ser. No. 565,436

Int. Cl. H02b *1/04, 9/00*

U.S. Cl. 317—101 3 Claims

ABSTRACT OF THE DISCLOSURE

Disclosed is an electronic chassis assembly using a modular unit which has a member used as a cover for electrical conducting means and as a handle for engaging and disengaging said modular unit from said electronic chassis assembly.

Figures 1, 2:
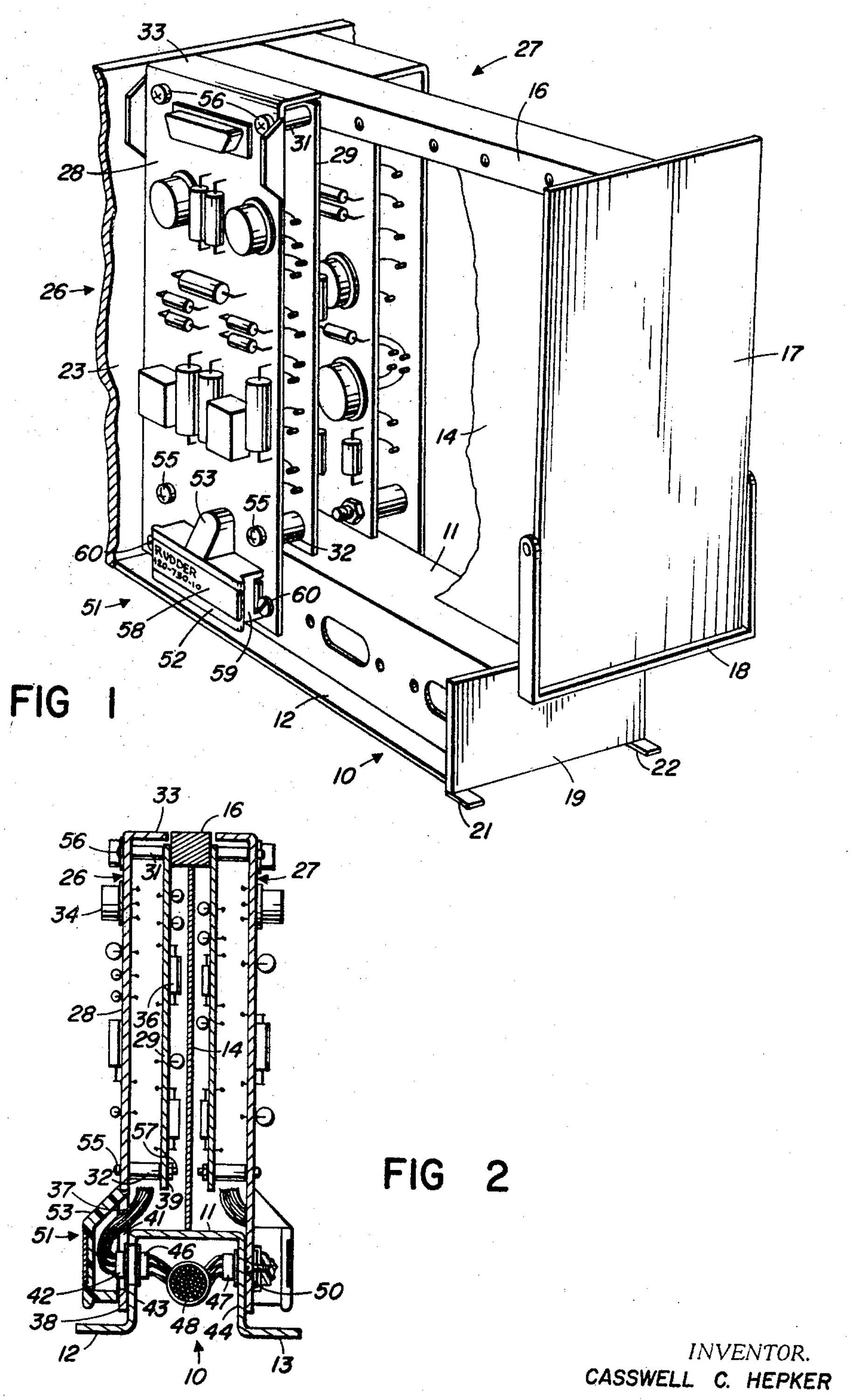

This invention relates in general to radio chassis and in particular to a method of assembling various modular units to a central base so that the completed assembly comprises a complete electronic unit.

It is an object of the present invention to provide a method of fabricating electronic equipment such that modular units may be easily removed from a chassis base to allow servicing or replacing of defective modules.

Another object of this invention is the provision for a compact and efficient assembly of components on a modular unit which may be easily connected to a chassis base so as to form a composite electronic equipment.

Another object is to provide a modular unit for mounting on a chassis base which has a handle that forms a cover member for electronic wiring and may be used for disengaging the unit and electrical connector when the modular unit is to be removed.

A feature of this invention is found in the provision for an electronic chassis formed with a base member and a central supporting unit to which a plurality of modular electronic units may be connected such that the assembled structure forms compact electronic equipment.

Further objects, features, and advantages of this invention will become apparent from the following description and claims when read in view of the accompanying drawings, in which:

FIGURE 1 is a partially cutaway perspective view of an electronic chassis assembled according to this invention; and, FIGURE 2 is a sectional view of the chassis.

FIGURE 1 illustrates a supporting chassis frame which has a base 10 which is formed with a central channel portion 11 between two outer legs 12 and 13. A center partition 14 extends upwardly from the channel portion 11 and supports a top bar 16. A front cover plate 17 is attached to the base 10, partition 14 and the bar 16 and has a handle 18 which is pivotally attached to the front plate 17 to allow the assembled unit to be removed and carried. A smaller front plate 19 covers the lower portion comprising the base 10 of the chassis and is offset inwardly from the front plate 17. The plate 19 carries a pair of lugs 21 and 22 for locking the chassis into a suitable shockmount in which the lugs 21 and 22 are engaged.

A rear plate 23 is attached to the rear portion of the chassis. Mounted between the end plates 17 and 23 on either side of the partition 14 are modular units 26 and 27. The modular units 26 and 27 are each formed of a pair of plates 28 and 29 which are spaced apart by standoffs 31 and 32. The plate 28 has a rim 33 which extends toward the plate 29. Electrical components 34 are mounted on the plate 28 and the leads to such components are inner-connected in the space between the plates 28 and 29. Likewise, components 36 are mounted on the side of plate 29 which is adjacent the partition 14 and the leads for such components are connected by suitable cabling between the plates 28 and 29. The plate 29 is spaced from center partition 14 a suitable distance. The leads are joined together and brought down to form a cable 37 which passed out from between plates 28 and 29. The plate 28 has a portion 38 which extends below the edge 39 of plate 29 and an opening 41 is formed in the lower portion 38 of plate 28 to allow the cabling 37 to pass through the opening and to a connector 42 which is mounted in the portion 38 of plate 28. The base member 10 has mounted in its vertical sides 43 and 44 connector members 46 and 47. The connector 46 in the assembled position mates with the connector 42 to complete the electrical circuitry from the module 26 to the connector 46. Connector 46 in turn joins a central cable 48 mounted within the base 10 which is in turn connected to a connector at the rear of the chassis for connecting the chassis to other electronic units and a suitable power and distribution system.

A composite cover and handle member 51 is attached to each module 26 and 27 mounted on the radio chassis and is formed of insulating material as, for example, a suitable plastic. As best shown in FIGURE 1, the handle 51 has a generally rectangular body portion 52 with an upwardly extending generally triangular shape extension 53. The upward extension 53 is hollow and covers the opening in the lower portion 38 of plate 28 to allow the cabling 37 to pass into the hollow confines of the handle 51 and to the connector 42. The handle 51 has a portion 52 which covers the connector 42. Suitable holding screws 50 pass through the plate 28 to hold the handle firmly to the plate.

Plates 28 and 29 are held together by bolts 55 and 56. The lower bolts 55 pass through the standoff 32 and engage nuts 57 on the back side of plate 29. The holding bolts 56 pass through plates 28 and 29 and standoffs 31 and are threaded into the bar 16 at the top of the chassis, thus rigidly attaching the top of the modules to the bar 16. The lower ends of the modules are held by the connector parts 42 and 46 and by holding bolts 60 which are threaded into portion 43 of the base 10.

It is to be realized that a number of modular units similar to modular unit 26 may be mounted to the chassis. Each modular unit may carry an identification indicia 58 which is printed on the handle 51 to easily identify the particular unit's function. To remove a particular modular unit, merely the bolts 56 and 60 are loosened from their mating openings in the bar 16 and base 10 and the unit may then be pulled from the chassis by use of the handle 51. The ends 59 of the handle are depressed so as to allow an easy hand hold. The connector 42 in the handle easily separates from the connector 46 in the base. If a defective modular unit is mounted on the chassis, that particular modular unit may be removed and replaced by a good unit of the same function. The connector 42 engages the connector 46 when the handle 51 is pressed and the bolts 56 and 60 may be tightened. The chassis may then be placed in its dust cover and mounted on its shockmount, not shown, by the lugs 21 and 22. It is noted that the plates 28 and 29 are separated by the spacing standoffs 31 and 32 and cooling air may be passed between the plates to cool the components, thus preventing overheating.

This invention relates to a method of assembly of a composite electronic equipment from a number of modular units to form a compact and efficient structure. Although this invention has been described with respect to particular embodiments thereof, it is not to be so limited, as changes and modifications may be made therein which are within the spirit and scope of the invention as defined by the appended claims.

I claim:

1. A modular unit for use in an electronic chassis assembly comprising: electrical components; component supporting means formed of a pair of plates mechanically supported in spaced arrangement with one of said plates having a portion extending below the edge of the other of said plates and having an opening formed in said portion; electrical conducting means cooperating to form a cable which extends through said opening; and a cover-and-handle member mounted on said component supporting means and attached to said one plate covering said opening to provide a cover for portions of said electrical conducting means and a handle for engaging and disengaging said modular unit from said electronic chassis assembly.

2. A modular unit according to claim 1 further comprising a connector comprising a first member mounted to said one plate within said cover-and-handle member and attached to said cable, and a second member mounted on said electronic chassis assembly said second member being engageable with said first member.

3. An electronic chassis assembly comprising a support member, a partition extending from the support member, a plurality of modular units comprising electrical components, component supporting means, electrical conducting means, and a cover-and-handle member mounted on said component supporting means, said cover-and-handle member used as a cover for portions of said electrical conducting means and as a handle for engaging and disengaging said modular unit from said electronic chassis.

References Cited

UNITED STATES PATENTS

| | | | |
|---|---|---|---|
| 2,191,637 | 2/1940 | Wier | 317—122 XR |
| 2,567,740 | 9/1951 | Smith | 317—122 |
| 2,579,141 | 12/1951 | Eckert et al. | |
| 3,184,645 | 5/1965 | Schaeffer. | |
| 3,383,565 | 5/1968 | Gritton | 317—101 |
| 2,434,918 | 1/1948 | Gall. | |
| 2,857,558 | 10/1958 | Fiske. | |
| 3,014,160 | 12/1961 | Brogden. | |
| 3,048,747 | 8/1962 | Errichiello. | |

ROBERT K. SCHAEFER, Primary Examiner

J. R. SCOTT, Assistant Examiner

U.S. Cl. X.R.

174—68.5